US008768163B2

(12) United States Patent
Kim et al.

(10) Patent No.: US 8,768,163 B2
(45) Date of Patent: Jul. 1, 2014

(54) DETECTING ROGUE ONU, OLT AND PON SYSTEM

(75) Inventors: Geun Yong Kim, Goyang-si (KR); Sung Chang Kim, Gwangju-si (KR); Dongsoo Lee, Gwangju-si (KR); Mun Seob Lee, Daejeon (KR); Hark Yoo, Gwangju-si (KR); Youngsuk Lee, Gwangju-si (KR); Sim Kwon Yoon, Gwangju-si (KR); Jong Deog Kim, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 67 days.

(21) Appl. No.: 13/219,123

(22) Filed: Aug. 26, 2011

(65) Prior Publication Data

US 2012/0163808 A1 Jun. 28, 2012

(30) Foreign Application Priority Data

Dec. 23, 2010 (KR) .................. 10-2010-0133177

(51) Int. Cl.
*H04B 17/00* (2006.01)
(52) U.S. Cl.
USPC ............................... 398/9; 398/33
(58) Field of Classification Search
CPC ............. H04Q 2011/0081; H04Q 2011/0083
USPC .......................................................... 398/9
See application file for complete search history.

(56) References Cited

U.S. PATENT DOCUMENTS

| 7,391,972 | B2 * | 6/2008 | Bernard et al. | 398/63 |
| 7,778,543 | B2 | 8/2010 | Ferguson et al. | |
| 7,840,135 | B2 * | 11/2010 | Zhao et al. | 398/33 |
| 8,064,764 | B2 * | 11/2011 | O'Byrne et al. | 398/25 |
| 8,249,446 | B2 * | 8/2012 | Smith et al. | 398/17 |
| 2006/0093356 | A1 * | 5/2006 | Vereen et al. | 398/33 |
| 2007/0098406 | A1 * | 5/2007 | Bernard et al. | 398/72 |
| 2008/0019690 | A1 * | 1/2008 | Zhao et al. | 398/17 |
| 2008/0044177 | A1 * | 2/2008 | Huang et al. | 398/15 |
| 2009/0123154 | A1 * | 5/2009 | Dalton et al. | 398/98 |
| 2011/0033180 | A1 * | 2/2011 | Smith et al. | 398/1 |
| 2012/0039602 | A1 * | 2/2012 | Hood | 398/38 |
| 2012/0045201 | A1 * | 2/2012 | Skubic et al. | 398/38 |
| 2012/0045210 | A1 * | 2/2012 | Kim et al. | 398/66 |
| 2012/0128357 | A1 * | 5/2012 | Mukai et al. | 398/58 |
| 2012/0263469 | A1 * | 10/2012 | Zhang et al. | 398/66 |
| 2013/0034356 | A1 * | 2/2013 | Luo et al. | 398/72 |
| 2013/0077972 | A1 * | 3/2013 | Zhang et al. | 398/58 |
| 2013/0089328 | A1 * | 4/2013 | Davis et al. | 398/58 |
| 2014/0029947 | A1 * | 1/2014 | Wan et al. | 398/67 |

FOREIGN PATENT DOCUMENTS

KR 1020060021134 3/2006

* cited by examiner

*Primary Examiner* — Ken Vanderpuye
*Assistant Examiner* — Ambitbir Sandhu
(74) *Attorney, Agent, or Firm* — Nelson Mullins Riley & Scarborough LLP

(57) ABSTRACT

A method and apparatus of detecting a rogue optical network unit (ONU) is provided. An optical line terminal (OLT) detects an abnormal upstream transmission to determine a plurality of rogue ONU candidates, and transmits a sleep allow message instructing a transition to a sleep mode to each of the plurality of rogue ONU candidates. The OLT detects the rogue ONU among the plurality of rogue ONU candidates based on upstream transmissions from the plurality of rogue ONU candidates in the sleep mode. Since the detection of the rogue ONU is performed in the sleep mode, the remaining ONUs can transition from the sleep mode to the normal mode after the detection of the rogue ONU is completed, thereby making it possible to rapidly resume upstream communication.

14 Claims, 6 Drawing Sheets

DETECTING ROGUE ONU, OLT AND PON SYSTEM

CROSS-REFERENCE TO RELATED APPLICATIONS

This application claims the benefit of priority of Korean Patent Application No. 10-2010-0133177 filed on Dec. 23, 2010, which is incorporated by reference in its entirety herein.

BACKGROUND OF THE INVENTION

1. Field of the Invention

The present invention relates to an optical network, and more particularly, to a method of detecting a rogue ONU, and an OLT and PON system using the same.

2. Related Art

A cable, a fiber optic, and a broadband connecting technology such as wireless have been widely distributed. In a communication network between a subscriber and a service provider, it is difficult to provide reliable high-quality voice/video services.

A passive optical network (PON) system connects an optical network unit (ONU) and an optical line terminal (OLT) through an optical line in a point-to-multipoint connection manner.

The OLT, which is a source of the PON, is disposed in a central office of a service provider. Downstream from the OLT is transmitted to a plurality of ONUs.

The PON system uses time division multiplexing in order to transmit upstream from the ONU to the OLT. Each ONU transmits the upstream only within a defined time interval according to upstream bandwidth allocation transmitted by the OLT.

When the ONU terminal of any terminals does not transmit upstream according to the upstream bandwidth allocation within a specific time interval, the ONU terminal of other subscribers cannot normally communicate with the OLT. In this case, in order to search the malfunctioning subscriber ONU terminal, there is a problem of searching subscriber terminals distributed within several tens of kilometers one by one.

Further, an optical power splitter disposed in a remote node is a passive device equally dividing the optical power by the number of ports, which cannot serve to intercept abnormal upstream transmission.

The rogue ONU implies an ONU that hinders the upstream communication of other normal ONUs by not transmitting upstream within a specific time interval according to the upstream bandwidth allocation information transmitted by the OLT, as described above. Physically, the rogue ONU implies an ONU that does not turn-off transmission laser of an optical transceiver of the ONU according to the upstream bandwidth allocation information.

The ONU should transmit upstream only within the time interval allocated to the ONU. The rogue ONU may deteriorate services of the normal ONUs. Therefore, the detection of a rogue ONU is one of the important issues in the PON system.

Disclosed are various methods in order to detect the rogue ONU. There is proposed a method of detecting the received optical signals by adding a hardware device to a receiving end of the optical transceiver of the OLT. As another example, there is proposed a method of sequentially disabling an operation of the rogue ONU candidates in a software manner. However, according to these methods, it takes much time to detect the rogue ONU. In addition, after the detection of the rogue ONU is completed, it takes much time to return normal ONUs to normal operation.

SUMMARY OF THE INVENTION

The present invention provides a method of detecting a rogue ONU abnormally transmitting upstream, and an OLT and PON system using the same.

The present invention also provides a method and apparatus of detecting a rogue ONU in a time division multiplexing PON system.

In an aspect, a method of detecting a rogue optical network unit (ONU) in a passive optical network (PON) is provided. The method includes detecting an abnormal upstream transmission to determine a plurality of rogue ONU candidates, transmitting a sleep allow message instructing a transition to a sleep mode to each of the plurality of rogue ONU candidates, and detecting the rogue ONU among the plurality of rogue ONU candidates based on upstream transmissions from the plurality of rogue ONU candidates in the sleep mode.

The method may further include transmitting upstream bandwidth allocation information to the plurality of rogue ONU candidates. The rogue ONU may be detected by checking whether the plurality of rogue ONU candidates transmit the upstream in accordance with the bandwidth allocation information.

A rogue ONU candidate which transmits the upstream inconsistently with the bandwidth allocation information may be detected as the rogue ONU.

The sleep allow message may sequentially be transmitted to each of the plurality of rogue ONU candidates, whereby each of the plurality of rogue ONU candidates transitions to the sleep mode and transmits the upstream at different time interval.

The sleep mode may include a dozing mode in which a transmitter of each rogue ONU candidate is turned-on/off and a cyclic sleep mode in which a transmitter and a receiver of each rogue ONU candidates are turned-on/off.

The method may further include configuring parameters for the sleep mode with the plurality of rogue ONU candidates based on an ONT management and control interface (OMCI).

The method may further include instructing the remaining ONUs, not the rogue ONU, among the plurality of rogue ONU candidates, to transition from the sleep mode to a normal mode.

In another aspect, an optical line terminal (OLT) of detecting a rogue optical network unit (ONU) in a passive optical network (PON) system is provided. The OLT includes an alarm unit for detecting an abnormal upstream transmission, and a rogue ONU detector for detecting a rogue ONU, wherein the rogue ONU detector is configured to determine a plurality of ONU candidates based on the abnormal upstream transmission, transmit a sleep allow message instructing a transition to a sleep mode to each of the plurality of rogue ONU candidates, and detect the rogue ONU among the plurality of rogue ONU candidates based on upstream transmissions from the plurality of rogue ONU candidates in the sleep mode.

In still another aspect, a passive optical network (PON) system detecting a rogue optical network unit (ONU) is provided. The method includes one or more ONUs for transmitting upstreams, and an optical line terminal (OLT) for detecting a rogue ONU and configured to detect an abnormal upstream transmission to determine a plurality of rogue ONU candidates, transmit a sleep allow message instructing a transition to a sleep mode to each of the plurality of rogue ONU candidates, and detect the rogue ONU among the plurality of rogue ONU candidates based on upstream transmissions from the plurality of rogue ONU candidates in the sleep mode.

DESCRIPTION OF EXEMPLARY EMBODIMENTS

First, a sleep mode of a 10 gigabit passive optical network (XG-GPON) standardized in an international telecommunication union-telecommunication standardization sector (ITU-T) will be described.

In a fiber to the home (FFTH) network, the optical network unit (ONU) installed at a subscriber end generally has a tendency to make time when it waits in a turn-on state longer than a time when an actual traffic is present due to the use of Internet services by a subscriber, by not directly turning-off the switch of the ONU. In order to prevent unnecessary consumption due to standby power of the ONU, various power saving technologies have been discussed in the International Organization for Standardization.

The ITU-T is performing standardization for two modes, a dozing mode and a cyclic sleep mode under the recognition of the need to save power in an optical network. The standardization contents are contents with regards to signaling and state diagram management between an optical line terminal (OLT) and an OLU. In the above-mentioned two modes, a target of power saving is commonly an optical transceiver.

Briefly describing, the dozing mode is a mode of periodically turning-on/off only a transmitter of the ONU, and the cyclic sleep mode is a mode of periodically turning-on/off both a transmitter and a receiver.

Figure 1:
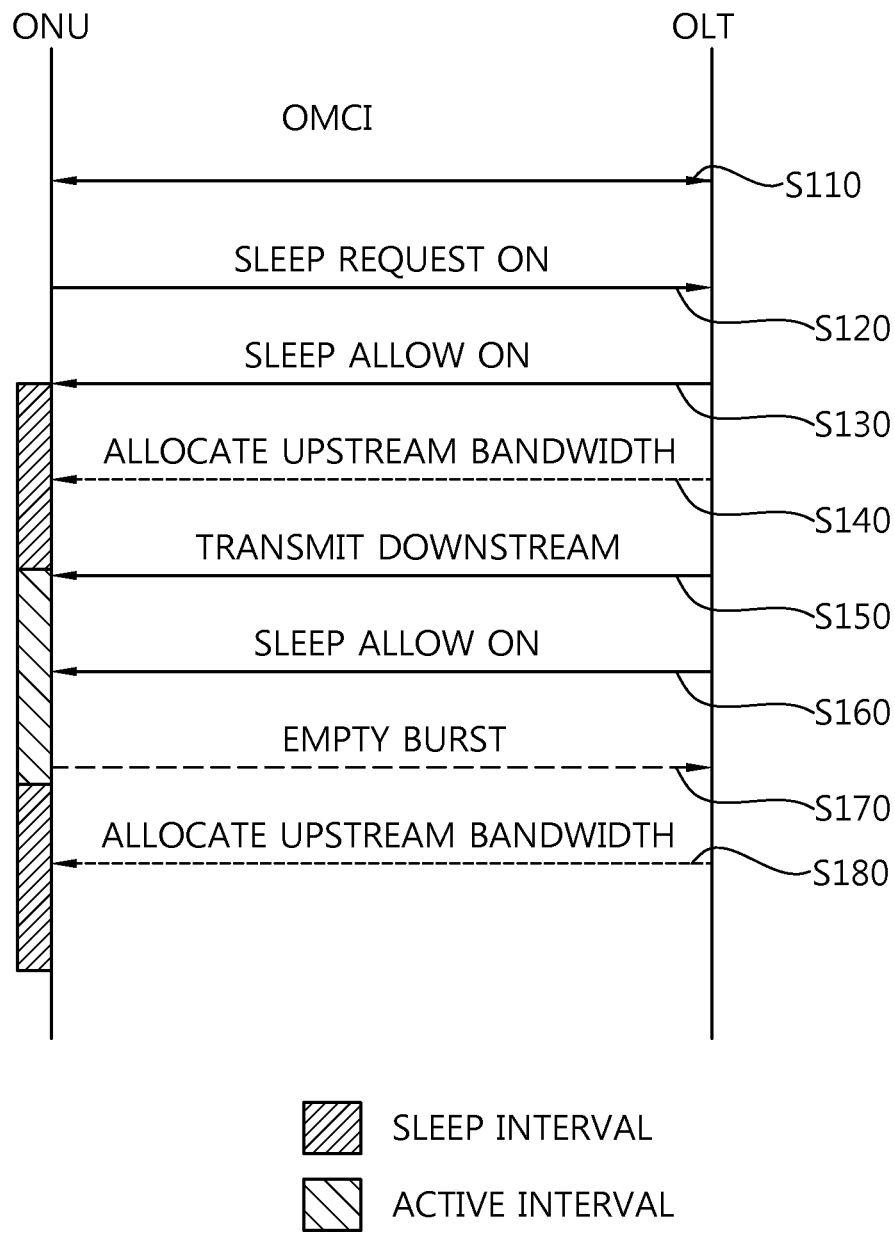
FIG. 1 is a flow chart showing a process of transitioning to a dozing mode or a cyclic sleep mode.

FIG. 1 is a flow chart showing a process of transitioning from a dozing mode or a cyclic sleep mode.

When the ONU is initially turned-on, the OLT acquires and sets up parameters associated with power saving of the corresponding ONU by using the OLU and an ONT management and control interface (OMCI) (S110). The OMCI specifies a control interface between the OLT and the ONU based on the ITU-T standard.

The parameters associated with power saving includes a sleep interval and an active interval. The sleep interval implies a period in which the transmitter is turned-off in the dozing mode and a period in which both the transmitter and the receiver are turned-off in the cyclic sleep mode. The active interval implies a period in which both the transmitter and the receiver are turned-on.

Hereinafter, the cyclic sleep mode will be described.

The ONU monitors the traffic of the transmitter and the receiver, and transmits a sleep request ON message requesting the transition to the cyclic sleep mode to the OLT when traffic is not present for a predetermined period (S120).

The OLT allows the transition to the cyclic sleep mode of the ONT using the sleep allow ON message (S130).

The ONT which receives the sleep allow ON message initiates the sleep mode by the sleep interval set up through the OMCI. After transmitting the sleep allow ON message, the OLT periodically transmits the minimum upstream bandwidth allocation to the ONU in order to rapidly perform a normal operation at the time of a specific event although the OLT acknowledges that the ONT is in the sleep mode (S140).

The OLT stores downstream in a buffer while the ONT is in the sleep mode and transmits the buffered downstream when the ONT wakes up.

Thereafter, the OLT transmits the sleep allow ON message allowing the transition to a next sleep mode to the ONT (S160).

Since the sleep allow ON message received in the active interval within the cyclic sleep mode is used to ask whether the ONU is normally operated or not, the ONU transmits an empty burst as an acknowledgement that the ONU is normally operated to the OLT and then, transitions to the sleep mode (S170).

After the ONT enters the sleep mode, the OLT periodically transmits the minimum upstream bandwidth allocation to the ONU (S180).

Figure 2:
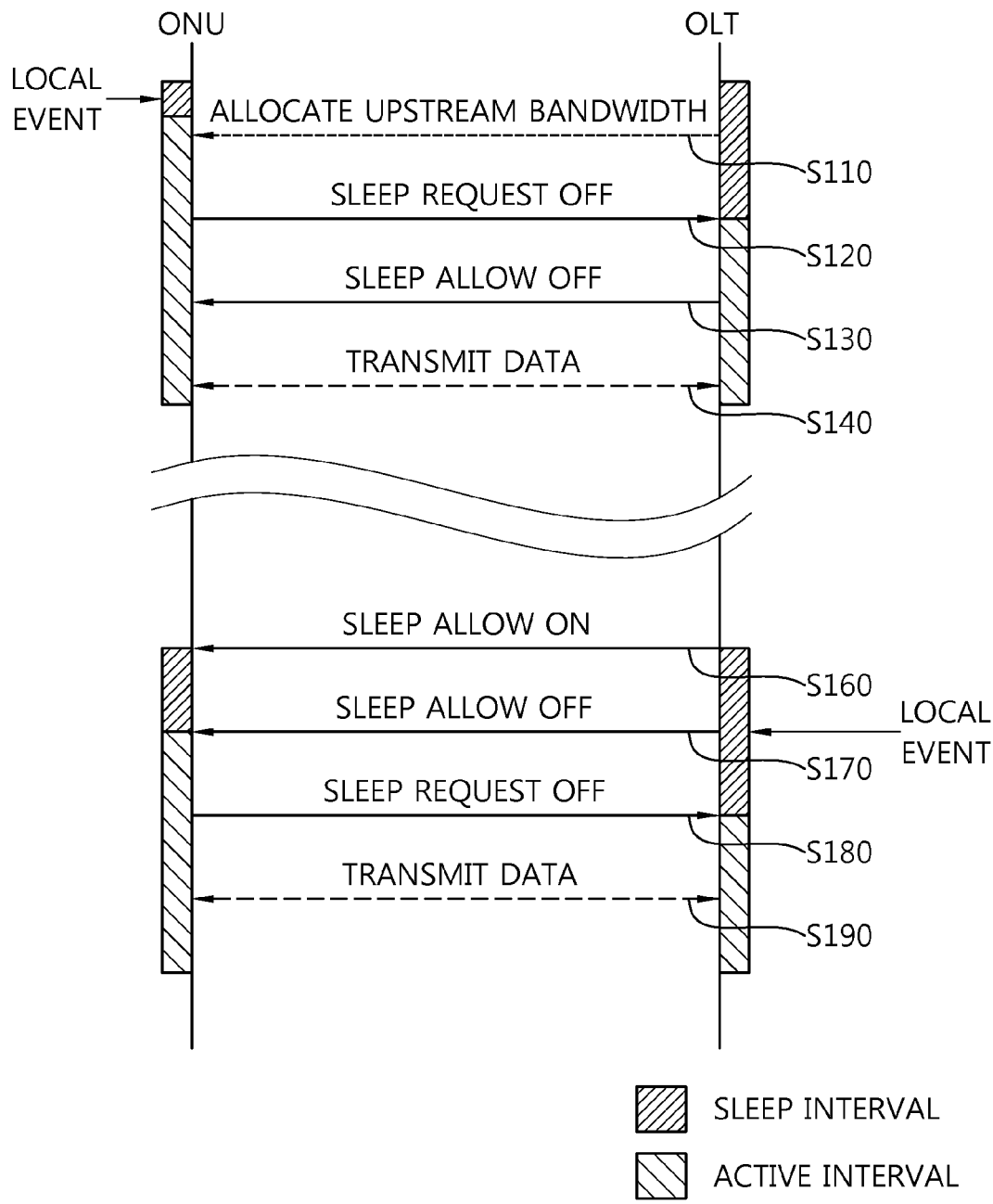
FIG. 2 is a flow chart showing a process of transitioning from a dozing mode or a cyclic sleep mode to a normal mode.

FIG. 2 is a flow chart showing a process of transitioning from the dozing mode or the cyclic sleep mode to the normal mode. The normal mode is a mode of keeping the ONU in an active state at all times.

Steps S110 to S140 show a process of transitioning from the sleep mode (dozing mode or cyclic sleep mode) to the normal mode when a local event is generated at the ONT side. The local event implies an event having the need to enter the ONU into the normal mode as in the case of picking up an Internet phone, turning-on a PC, turning-on an IPTV, etc.

The ONU is switched to the active interval and periodically receives the upstream bandwidth allocation message (S110).

The ONT which receives the upstream bandwidth allocation transmits a sleep request OFF message requesting the transition to the normal mode to the OLT (S120).

The OLT which receives the sleep request OFF message transitions to the active state and transmits the sleep allow OFF message allowing the transition to the normal mode to the corresponding ONU (S130).

Thereafter, the OLT and the ONU are operated in the normal mode and data are exchanged between the OLT and ONU (S140).

Steps S160 to S190 show a process of transitioning to the normal mode by generating the local event at the OLT side.

Under the situation where the local event does not occur, the OLT transmits the sleep allow ON message allowing the transition to the next sleep mode to the ONU (S160).

Thereafter, when the local event occurs in the OLT, the OLT transmits the sleep allow OFF message requesting the immediate transition from the sleep mode to the active mode to the ONU (S170).

The ONU receiving the sleep allow OFF message is switched into the normal mode and transmits the sleep request OFF message as the response for the sleep allow OFF message to the OLU (S180).

After the OLT receives the sleep request OFF message, it transitions the state information of the corresponding ONU to the normal mode. Thereafter, the data transmission is normally performed between the OLT and the ONT (S190).

As described above, the conventional power saving firstly sets up variables associated with the sleep mode based on the OMCI. The ONU periodically turns-on/off the receiver through signaling between the OLT and the ONU (dozing mode) and simultaneously turns-on/off the transmitter and the receiver (cyclic sleep mode), thereby saving the standby power.

The method proposed in the present invention is a method of detecting the rogue ONU by using the fact that the transmission signal of the optical transceiver of the ONU periodically repeats the turn-on/off in the sleep mode.

The OLT forces for rogue ONU candidates to transition to the sleep mode. Each ONU sequentially transitions to the sleep mode so that the transmission signal of the optical transceiver of each rogue ONU candidates becomes a turn-on state at different time. The ONU detects the rogue ONU by monitoring the upstream transmission of each of the rogue ONU candidates.

Hereinafter, the method of detecting the rogue ONU proposed in the present invention will be described in more detail.

Figure 3:
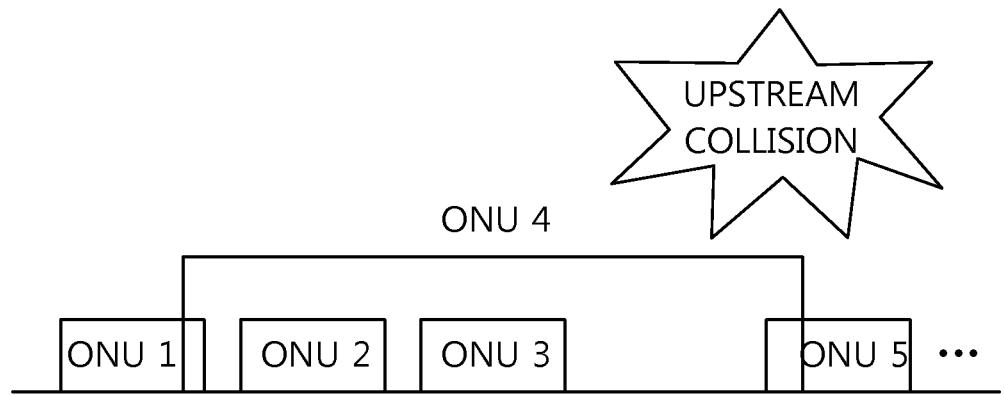
FIG. 3 shows a case where an abnormal upstream transmission occurs.

FIG. 3 shows a case where an abnormal upstream transmission occurs.

There are five ONUs, ONU1 to ONU5. In this case, the transmission of ONU1, ONU2, ONU3, and ONU5 becomes abnormal due to the wrong upstream transmission of ONU 4. The abnormal state can be sensed through alarm information that is a basic function of the OLT. The OLT which meets the specification basically has the alarm monitoring function for upstream traffic of each ONU, thereby making it possible to sense the abnormal upstream transmission.

However, the OLT cannot appreciate which one of the ONU1 to ONU 5 is a rogue ONU. The ONU1 to ONU5 become rogue ONU candidates.

Figure 4:
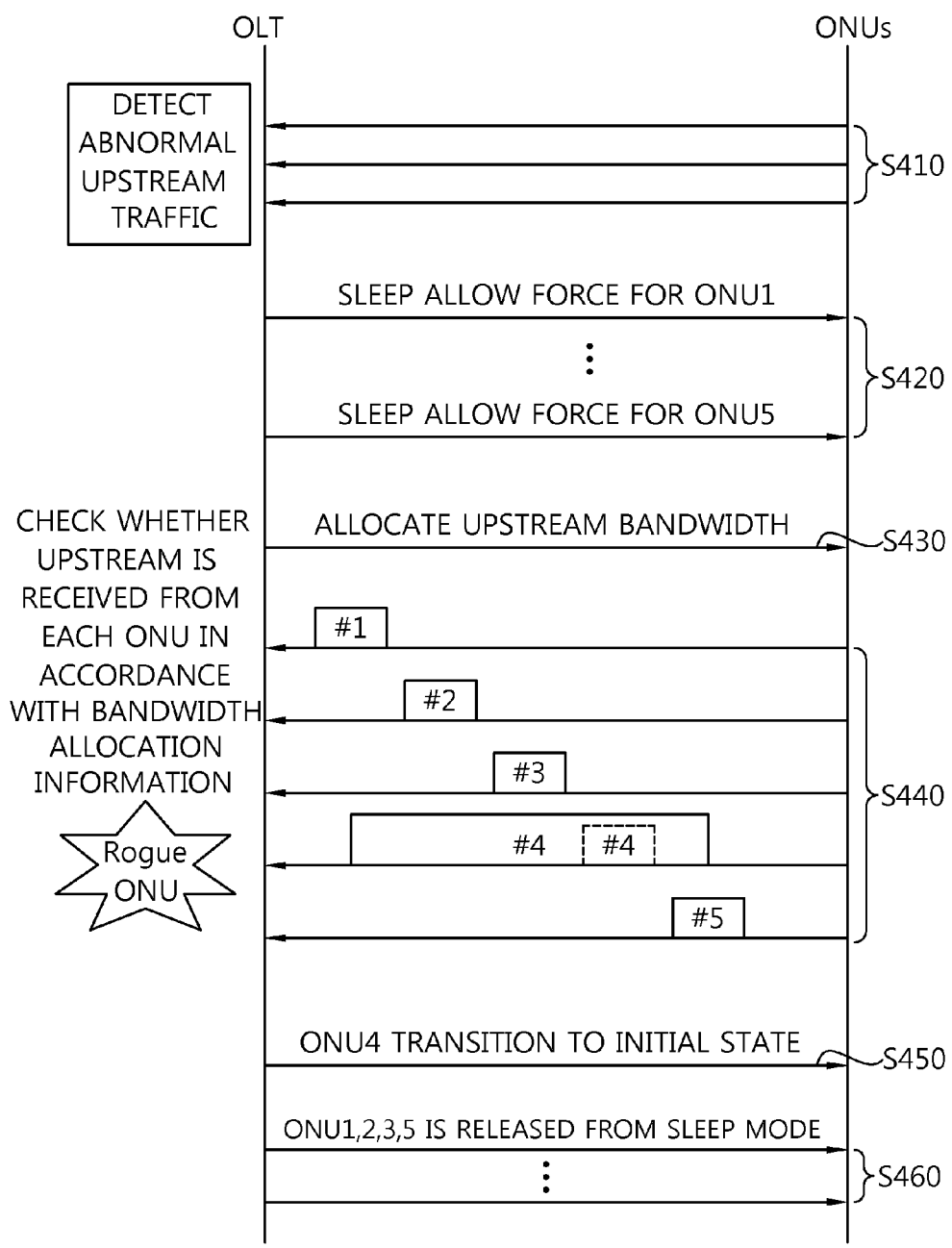
FIG. 4 is a flow chart showing a method of detecting a rogue ONU according to an exemplary embodiment of the present invention.

FIG. 4 is a flow chart showing a method of detecting the rogue ONU according to an exemplary embodiment of the present invention.

The OLT senses that the upstream traffic transmission becomes abnormal, thereby determining the rogue ONU candidates (S410). It is assumed that the ONU1 to ONU5 are the rogue ONU candidates.

The OLT sequentially transmits sleep allow force messages in order for the ONU1 to ONU5 to forcibly transition to the sleep mode (S420). The ONUs receiving the sleep allow force messages repeat the transmit ON/OFF of the optical transceiver. The repetition period follows parameter values predefined for the sleep mode by the OMCI.

The ONU which receives the sleep allow force messages knows that this message is used not to transition to the normal sleep mode state but to detect the rogue ONU. Accordingly, the local event, etc., operated in the normal sleep mode does not occur.

The ONU1 to ONU5 sequentially transition to the sleep mode in order to turn-on/off the Tx of the optical transceiver of each ONU at different times. Upstreams for each ONU are transmitted at different upstream frames.

The OLT transmits upstream bandwidth allocation information to the ONU1 to ONU5 (S430). The OLT checks the upstream traffic for each ONU to detect the rogue ONU (S440). The OLT checks whether each ONU transmits the upstream in accordance with the upstream bandwidth allocation information. If the upstream is transmitted inconsistently with the upstream bandwidth allocation information, the OLT may determine the corresponding ONU as the rogue ONU.

Figure 5:
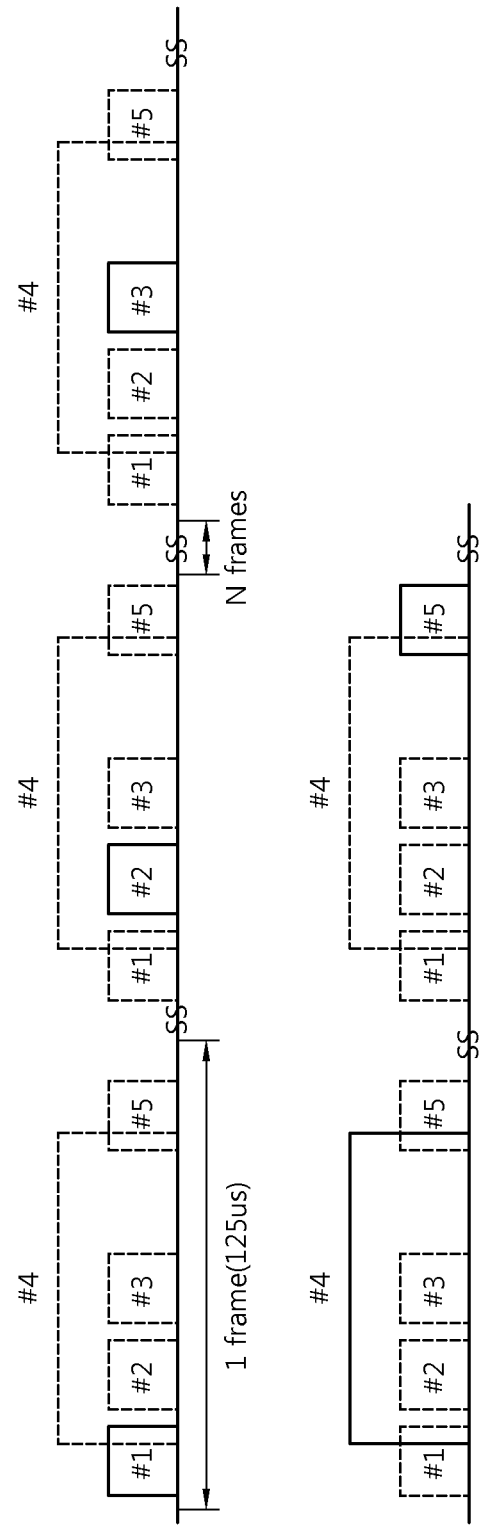
FIG. 5 shows upstream traffic transmission for each ONU transmitted at different frames.

FIG. 5 shows the upstream traffic transmission for each ONU transmitted at different frames. The OLT which meets the standard uses 125 us as a single frame to transmit the upstream bandwidth allocation information. Each ONU transmits the upstream stream for each N+1 frame. The OLT can appreciate through the alarm information that ONU 4 does not follow the upstream bandwidth allocation information. Since the OLT knows when upstream of the ONU is transmitted, all the ONUs do not necessarily need to transmit upstream at the same upstream frame interval.

Referring again to FIG. 4, the OLT commands ONU 4, determined as the rogue ONU, to transition to an initial state (S450). The command for transition to the initial state may be transmitted through a deactivate_ONU-ID PLOAM message. The initial state is a state before the ONU is registered in the OLT. The OLT does not transmit the upstream bandwidth allocation information for the upstream transmission to the ONU in the initial state.

The OLT releases ONU1, ONU2, ONU3, and ONU5 from the sleep mode through the sleep allow OFF message and transitions them to the normal mode (S460).

The detection of the rogue ONU is progressed in the sleep mode. Since the remaining ONUs, which are the rogue ONU candidates, transition from the sleep mode to the normal mode after the detection of the rogue ONU is completed, upstream communication may be rapidly resumed.

Table 1 shows an example of the format of the sleep allow force message for forcibly transitioning the rogue ONU candidates to the sleep mode.

TABLE 1

| Octet | Item | Description |
|---|---|---|
| 1-2 | ONU-ID | Identifier of ONU |
| 3 | 0x12 | Message ID "Sleep Allow" |
| 4 | Seq. No | Message sequence number |
| 5 | Activity Level | A sleep mode indicator for identifying cyclic sleep mode, dozing mode, and sleep mode for detecting rogue ONU<br>Bit 1(MSB): Allow dozing mode (1: ON, 0: OFF)<br>Bit 2: Allow cyclic sleep mode (1: ON, 0: OFF)<br>Bit 3: force sleep mode for detecting rogue ONU |
| 6-40 | Padding | 0x00 |
| 41-48 | MIC | Message Integrity Check |

Table 1 shows an example of defining the force sleep mode by using a third bit of "activity level" of the sleep_allow_PLOAM message used in the XG_PON. In order to define the force sleep mode, the PLOAM message may be defined.

The above description is based on the XG-PON specification by the ITU-T. However, the sleep mode is only an example of the power saving technology. The method of detecting the rogue ONU according to the exemplary embodiment of the present invention may be applied even in the gigabit-capable passive optical networks (GPON) or the other PON system.

Figure 6:
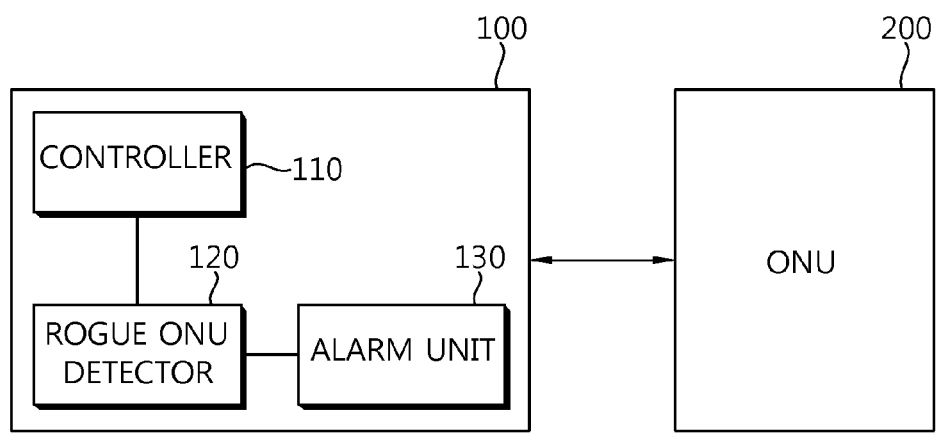
FIG. 6 is a diagram showing a system implementing the exemplary embodiment of the present invention.

FIG. 6 is a diagram showing a system implementing the exemplary embodiment of the present invention.

The OLT 100 is connected to one or more ONU 200 to detect the rogue ONU.

The ONU 200 transmits the upstream and transitions from the normal mode to the sleep mode or from the sleep mode to the normal mode.

The OLT 100 includes a controller 110, a rogue ONU detector 120, and an alarm unit 130. The controller 110 controls the operation of the OLT 100. The alarm unit 130 detects whether the upstream traffic transmission of the ONU 200 is in the abnormal state.

The rogue ONU detector 120 implements the method of detecting the rogue ONU in the above-mentioned exemplary embodiment of FIG. 4. The rogue ONU detector 120 determines the plurality of rogue ONU candidates and transmits the sleep allow message instructing the transition to the sleep mode to the plurality of rogue ONU candidates and detects the rogue ONU among the plurality of rogue ONU candidates in the sleep mode based on the upstream transmission of the plurality of rogue ONU candidates.

A rogue ONU transmitting abnormal upstream can be detected. The upstream transmission of the rogue ONU can remotely be intercepted, thereby making it possible to prevent the quality of service of the normal ONU from being deteriorated.

Since the detection of the rogue ONU is performed in the sleep mode, the remaining ONUs can transition from the sleep mode to the normal mode after the detection of the rogue ONU is completed, thereby making it possible to rapidly resume upstream communication.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of detecting a rogue optical network unit (ONU) in a passive optical network (PON), comprising:
   configuring parameters for a sleep mode with a plurality of rogue ONU candidates based on an ONT management and control interface (OMCI);
   detecting an abnormal upstream transmission to determine the plurality of rogue ONU candidates;
   transmitting a sleep allow message instructing a transition to the sleep mode to each of the plurality of rogue ONU candidates; and
   detecting the rogue ONU among the plurality of rogue ONU candidates based on upstream transmissions from the plurality of rogue ONU candidates in the sleep mode, wherein the sleep mode includes a dozing mode in which a transmitter of each rogue ONU candidate is turned-on or turned-off and a cyclic sleep mode in which a transmitter and a receiver of each rogue ONU candidate are turned-on or turned-off.

2. The method of claim 1, further comprising:
   transmitting upstream bandwidth allocation information to the plurality of rogue ONU candidates,
   wherein the rogue ONU is detected by checking whether the plurality of rogue ONU candidates transmit the upstream in accordance with the bandwidth allocation information.

3. The method of claim 2, wherein a rogue ONU candidate which transmits the upstream inconsistently with the bandwidth allocation information is detected as the rogue ONU.

4. The method of claim 1, wherein the sleep allow message is sequentially transmitted to each of the plurality of rogue ONU candidates, whereby each of the plurality of rogue ONU candidates transitions to the sleep mode and transmits the upstream at different time interval.

5. The method of claim 1, further comprising:
   instructing remaining ONUs, not the rogue ONU, among the plurality of rogue ONU candidates, to transition from the sleep mode to a normal mode.

6. An optical line terminal (OLT) of detecting a rogue optical network unit (ONU) in a passive optical network (PON) system, comprising:
   an alarm unit for detecting an abnormal upstream transmission; and
   a rogue ONU detector for detecting a rogue ONU,
   wherein the rogue ONU detector is configured to:
   determine a plurality of ONU candidates based on the abnormal upstream transmission,
   transmit a sleep allow message instructing a transition to a sleep mode to each of the plurality of rogue ONU candidates, and
   detect the rogue ONU among the plurality of rogue ONU candidates based on upstream transmissions from the plurality of rogue ONU candidates in the sleep mode,
   wherein the sleep mode includes a dozing mode in which a transmitter of each rogue ONU candidate is turned-on or turned-off and a cyclic sleep mode in which a transmitter and a receiver of each rogue ONU candidate are turned-on or turned-off.

7. The OLT of claim 6, wherein the rogue ONU detector is configured to transmit upstream bandwidth allocation information to the plurality of rogue ONU candidates, wherein the rogue ONU is detected by checking whether the plurality of rogue ONU candidates transmit the upstream in accordance with the bandwidth allocation information.

8. The OLT of claim 7, wherein the rogue ONU detector is configured to detect a rogue ONU candidate which transmits the upstream inconsistently with the bandwidth allocation information as the rogue ONU.

9. The OLT of claim 6, wherein the rogue ONU detector is configured to transmit the sleep allow message sequentially to each of the plurality of rogue ONU, whereby each of the plurality of rogue ONU candidates transitions to the sleep mode and transmits the upstream at different time interval.

10. A passive optical network (PON) system detecting a rogue optical network unit (ONU), comprising:
    one or more ONUs for transmitting upstreams; and
    an optical line terminal (OLT) for detecting a rogue ONU and configured to:
    configure parameters for a sleep mode with a plurality of rogue ONU candidates based on an ONT management and control interface (OMCI);
    detect an abnormal upstream transmission to determine the plurality of rogue ONU candidates;
    transmit a sleep allow message instructing a transition to the sleep mode to each of the plurality of rogue ONU candidates; and
    detect the rogue ONU among the plurality of rogue ONU candidates based on upstream transmissions from the plurality of rogue ONU candidates in the sleep mode,
    wherein the sleep mode includes a dozing mode in which a transmitter of each rogue ONU candidate is turned-on or turned-off and a cyclic sleep mode in which a transmitter and a receiver of each rogue ONU candidate are turned-on or turned-off.

11. The PON system of claim 10, wherein the OLT is configured to transmit upstream bandwidth allocation information to the plurality of rogue ONU candidates, wherein the rogue ONU is detected by checking whether the plurality of rogue ONU candidates transmit the upstream in accordance with the bandwidth allocation information.

12. The PON system of claim 11, wherein the OLT is configured to detect a rogue ONU candidate which transmits the upstream inconsistently with the bandwidth allocation information as the rogue ONU.

13. The PON system of claim 10, wherein the OLT is configured to transmit the sleep allow message sequentially to each of the plurality of rogue ONU, whereby each of the plurality of rogue ONU candidates transitions to the sleep mode and transmits the upstream at different time interval.

14. The PON system of claim 10, wherein the OLT is configured to instruct the remaining ONUs, not the rogue ONU, among the plurality of rogue ONU candidates, to transition from the sleep mode to a normal mode.

* * * * *